United States Patent [19]

Mortensen

[11] 3,942,407
[45] Mar. 9, 1976

[54] EXPANDABLE SCREW ANCHORING DEVICES

[76] Inventor: Louis Aackersberg Mortensen, Expandet Screw Anchors A/S, Kongevejen 35, 3460 Birkerod, Denmark

[22] Filed: Aug. 6, 1974

[21] Appl. No.: 495,290

Related U.S. Application Data

[63] Continuation of Ser. No. 237,044, March 22, 1972, abandoned, which is a continuation-in-part of Ser. No. 39,886, May 22, 1970, abandoned.

[30] Foreign Application Priority Data

May 30, 1969 Denmark .......................... 2954/69

[52] U.S. Cl. .................................................. 85/71
[51] Int. Cl.² .......................................... F16B 13/04
[58] Field of Search .............. 85/71, 73, 74, 75, 70, 85/69

[56] References Cited
UNITED STATES PATENTS

| | | | |
|---|---|---|---|
| 1,929,743 | 10/1933 | Janvis | 85/70 |
| 2,236,079 | 3/1941 | Wipper | 85/71 |
| 2,513,193 | 6/1950 | Miller | 85/67 |
| 2,525,736 | 10/1950 | Taylor | 85/70 |
| 2,753,610 | 7/1956 | Miller | 85/70 |
| 2,918,841 | 12/1959 | Poupitch | 85/71 |
| 3,009,747 | 11/1961 | Pitzer | 85/67 |
| 3,257,889 | 6/1966 | Fischer | 85/70 |

FOREIGN PATENTS OR APPLICATIONS

| | | | |
|---|---|---|---|
| 436,238 | 10/1935 | United Kingdom | 85/74 |
| 598,730 | 2/1948 | United Kingdom | 85/71 |

*Primary Examiner*—Edward C. Allen
*Attorney, Agent, or Firm*—Robert E. Burns; Emmanuel J. Lobato; Bruce L. Adams

[57] ABSTRACT

The invention relates to a screw anchoring device adapted to be inserted in a bored hole and of the type having a tubular anchoring member moulded from plastics material and provided with longitudinally — for example axially or helically — extending slits or slots. The anchoring member cooperates with a screw in such a manner that the anchoring member may be axially compressed and thereby radially expanded by tightening of the screw. A sleeve or tubular member inserted in one end of the anchoring member cooperates with an internal shoulder abutment within the anchoring member, whereby the anchoring device is made universally applicable so that it may be mounted as well in through holes in panels or plates as in non-through holes in solid walls whether these walls are made from more or less pressure resistant materials and whether the diameters of the bored holes correspond more or less to the outer diameter of the anchoring device. The sleeve inserted in the tubular anchoring member may be of a semi-rigid, deformable material, and between the sleeve and the internal shoulder an expansion member may be arranged. The expansion member is driven into the adjacent end of the sleeve when the anchoring device is axially compressed to assist radial bulging of the respective end portion of the anchoring member.

17 Claims, 21 Drawing Figures

EXPANDABLE SCREW ANCHORING DEVICES

This is a continuation of application Ser. No. 237,044, filed Mar. 22, 1972, which is a continuation-in-part of application Ser. No. 39,886 filed May 22, 1970 both now abandoned.

BACKGROUND OF THE INVENTION

1. Field of the Invention

The invention relates to an expandable anchoring device to be inserted in and fastened within a bored hole, said device comprising a tubular anchoring member moulded from a deformable plastics material and being provided with an internal abutment or shoulder and a thread portion for cooperating with a screw, longitudinally extending slits or slots being provided in the wall of said anchoring member.

2. Description of the Prior Art

Such an anchoring device is disclosed in for example U.S. Pat. No. 2,918,841. Anchoring devices of said type are used in cases where an object is to be fastened to thin walls, plates or panels, the back of which is inaccessible or accessible only with difficulty for example, wall elements formed by spaced panels or plates defining between them a cavity which may be filled with a soft or crisp insulating material. The slits or slots of the anchoring member may for example, be axially or helically extending, separate the wall of the anchoring member into strip-formed or band-formed parts. When an anchoring device of the type described is inserted in a bored hole in a wall or plate in such a manner that the inserted end portion of the anchoring device projects beyond the back of the plate or wall and the deformable anchoring device is then compressed by screwing the screw into engagement with the thread portion of the anchoring member, the inner end of the anchoring member will be moved in relation to the plate or wall, and the anchoring member will mainly tend to bulge at that inner end being moved, whereby the strip-formed or band-formed parts at the projecting end portion of the anchoring member are bended outwardly and form against the back of the plate an abutment, and thereby an object of some kind may be fastened to the accessible front of the plate or wall.

When a fastening device of the type described is mounted in a plate of a relatively soft material, such as a plasterboard and the screw is vigorously tightened the expanded parts of the anchoring device forming the said abutment against the back of the plate will be pressed into the back of the soft plate whereby the plate may be damaged. If, alternatively, the anchoring device is mounted in a plate of a relatively hard material, such as a plate or hardened masonite or a plywood panel, a vigorous tightening of the screw may cause cutting of the bended band-formed parts of the anchoring member because said parts are pressed against the edges around the bored hole. If the band-formed parts are cut, the anchoring device will of course become ineffective.

Furthermore, various types of dowels or wall plugs adapted to be mounted within non-through holes in solid walls are known. The effect of these dowels or wall plugs is based on the fact that their inner diameter is smaller than the outer diameter of the core of the belonging screw — which is normally a self-tapping screw such as wood screw — and thus the dowel is expanded radially when the screw is screwed into the same whereby the dowel is wedged in the bored hole. The pressure thereby exerted on the wall material may cause peeling of wall material around the mouth or entrance of the bored hole, unless the outer end of the dowel is pushed inwardly so as to be spaced from the said entrance of the hole. Furthermore, when using the said dowels, it is not possible to obtain a satisfactory wedging within a bored hole if the inner diameter of the same substantially exceeds the outer diameter of the dowel.

SUMMARY OF THE INVENTION

The object of the invention is to provide a universally applicable anchoring device of the type described which may be mounted in through holes as well as in non-through holes and by which the disadvantages mentioned in connection with the known anchoring devices or dowels may be partly or totally eliminated.

At the end opposite to said thread portion the anchoring device according to the invention is provided with a sleeve or tubular member inserted in the anchoring member and aligned with said internal abutment.

Preferably said sleeve or tubular member is substantially less compressible in axial direction than the anchoring member. This reduced compressibility may be obtained by selecting a suitable cross-section area and/or material.

In the present specification the term "thread portion" is intended to comprise an inner surface having preformed internal threads as well as an inner surface intended to cooperate with a self-tapping screw.

When the anchoring device according to the invention is to be mounted in a through hole in a plate or wall, the length of the sleeve or tubular member is preferably selected so as to exceed the thickness of said plate or wall. The sleeve or tubular member may be removably inserted in the anchoring member. In that case one and the same anchoring member may be used in connection with plates or panels of widely varying thicknesses, if desired, because the anchoring member may be provided with a sleeve having a length selected so as to correspond to the thickness of the plate in connection with which the anchoring device is to be used. When the anchoring device according to the invention has been mounted within a bored hole in a plate or panel and the screw is then vigorously tightened, the anchoring member will be compressed until the sleeve and the internal shoulder or abutment of the anchoring member aligned therewith present further axial compression of the anchoring member. Thus this cooperation between the sleeve and the internal abutment prevents damage of the back of the plate or panel as well as cutting of the band-formed parts of the anchoring member.

The use of said sleeve or tubular member also counteracts an inwardly directed radial deformation of the part of the anchoring member positioned within the bored hole. Thereby a perfect engagement between the anchoring member and the wall of the bored hole may be obtained, and this is especially important when the fastening device is used for fastening a relatively heavy object.

The anchoring device according to the invention may, however, also be mounted within non-through holes bored in the heavy solid wall. This increased applicability of the anchoring device according to the invention is primarily permitted by the presence of said sleeve or tubular member. Then an anchoring device according to the invention is mounted in a bored hole in a solid wall of gas concrete or light concrete or another porous and less pressure resistant building material, and the screw of the anchoring device is thereafter tightened, the anchoring member will mainly tend to bulge at its inner end being moved in relation to the wall as mentioned previously. The sleeve or tubular member inserted in the anchoring member will, however, limit the outward movement of the bulged inner end of the anchoring member, whereby the bulged part will be positioned at a certain distance from the entrance of the bored hole even when the anchoring device is vigorously tightened. The said distance may be determined by selecting the length of the sleeve. In case the anchoring device was not provided with the said sleeve or tubular member said bulge could be moved or drawn out to the entrance or mouth of the bored hole so that in fact no anchoring effect would be obtained by vigorously tightening of the screw cooperating with the anchoring device.

In case the non-through hole is bored in a more pressure resistant material, such as concrete or brick, the anchoring device according to the invention will not be able to displace the said material to any substantial degree when the belonging screw is tightened. However, the compressed anchoring member will be pressed against the wall of the bored hole with a substantial pressure so that an effective anchoring is obtained.

Even if the bored hole has an inner diameter substantially exceeding the outer diameter of the untightened anchoring member, an excellent anchoring of the anchoring device according to the invention may be obtained, because by tightening the screw the anchoring member will be shortened and its outer diameter will simultaneously be increased until the anchoring member is pressed in engagement with the wall of the oversized bored hole with a substantial pressure.

According to the invention the said sleeve may be of a relatively stiff or rigid material, and a tube of a soft deformable material, for example soft plastic or rubber, may then be arranged between said stiff sleeve and the internal abutment in the anchoring member. When the screw of the anchoring device is tightened the soft tube will be radically compressed axially, and thereby it will expand radially. The tube compressed in this manner serves as a kind of buffer counteracting the tendency of cutting and damaging the strip-formed or band-formed parts of the anchoring member by vigorously tightening of the screw belonging to the anchoring device.

It has been found that it is possible to obtain a similar effect by using a sleeve made from a semi-rigid deformable material and by omitting the said tube of soft material. In that case the sleeve is preferably selected with a greater length than when the sleeve is made from a more stiff or rigid material. When a sleeve made from a semi-rigid material is used, the inner end portion of the sleeve may advantageously be slit by a number of longitudinally extending slits. These slits may, for example, be axial, helical or inclined in relation to the longitudinal axis of said sleeve. These slits facilitate radial bulding of the end portion of the sleeve when the anchoring device is compressed axially.

According to the invention it may be advantageous to arrange a tubular expansion member within the tubular anchoring member between said internal abutment or shoulder and the tubular member, said expansion member having a maximum cross section exceeding that of the bore of the adjacent tubular member, which may be the said soft tube or said sleeve, and being adapted to be driven into and to expand the adjacent end of the tubular member when the anchoring device is axially compressed by tightening of the corresponding screw. The said expansion member promotes the initial bulging of the end portion of the adjacent tubular member, which may be the said semi-rigid sleeve or the said soft tube. Additionally, the tubular expansion member which is made from a material being more hard or stiff than the material from which the adjacent tubular member is made, secures a very uniform radial bulging of the tubular member into which it is driven. Furthermore, the rather stiff tubular expansion member surrounding the screw prevents that the material from the tubular member is pressed inwardly into contact with the threads of the screw when the anchoring device is axially compressed by tightening the screw. Such contact between the material of the tubular member and the screw would tend to make it more difficult to tighten and unscrew the screw.

The expansion member may for example be an axially extending projection formed on and integrally with said abutment or shoulder. The expansion member is, however, preferably a separate tubular member tapered at one end and advantageously at both ends. The last-mentioned tubular member with tapered ends also comprises a member having a spheric or ball-shaped outer surface and a diametrically extending bore.

The thread portion of the anchoring member may according to the invention be constituted by a nut secured to the anchoring member at one end thereof, the inner end of said nut extending beyond the roots of the band-formed parts defined between the slits or slots in the wall of the anchoring member, said inner end of the nut being separated from the band-formed parts and forming the internal abutment of the anchoring member. Thereby the bending stresses generated at the roots of the band-formed parts by tightening the screw of the anchoring device are diminished. The nut secured to the anchoring member may be made from any suitable material, but the nut is preferably made from glass fibre, reinforced plastics, or from metal so that the threads of the nut are proof against a vigorous tightening of the screw.

A tubular anchoring member of the type described may be moulded in a mould having a number of mould parts corresponding to the numbers of slits or slots in the anchoring member. However, in a mould of that type only rather few anchoring members may be moulded by each moulding operation.

Normally the anchoring members described are provided with an abutment flange at the end opposite to the thread portion. In the anchoring member used in connection with the anchoring device according to the invention the slits or slots are extended right up to the said abutment flange. The anchoring member may then, if provided with a tubular member or sleeve of a suitable length, be used as well for anchoring device adapted to be mounted in a very thin plate or panel as in a plate or panel having a substantial thickness or, as described previously, in a solid wall.

The tubular anchoring member may, however, advantageously be produced in a mould cavity with a cylindrical core extending into said cavity and being provided with longitudinally extending, mutually parallel and spaced ribs the radial heigth of which is greater than or equal to the wall thickness of the tubular fastening member to be moulded, but smaller than the radial width of the flange, said method comprising arranging the core in such a manner that said ribs extend through the flange of the fastening member during moulding and removing the fastening member from the core after moulding by providing an axial displacement of said fastening member in relation to the core in the direction of the ribs. It is appreciated that by this method a mould separated into only two moulds may be used, and any number of mould cavities may be formed in the said mould so that a considerable number of anchoring members may be produced by each moulding operation.

In the anchoring members produced by the method described the slits or slots extend right up to and even through the collar or flange of the anchoring member and therefore such anchoring member is especially suitable for use in connection with the previously described anchoring device according to the invention.

The anchoring member may, for example, be produced with straight axial slits or with helically formed slits or slots, and in these cases the core used in the method described must also be provided with straight and helically formed ribs, respectively.

BRIEF DESCRIPTION OF THE DRAWING

Other and further objects and advantages of the present invention will be apparent from the following description when taken in connection with the accompanying figures, wherein.

DESCRIPTION OF THE PREFERRED EMBODIMENTS

Figure 1:
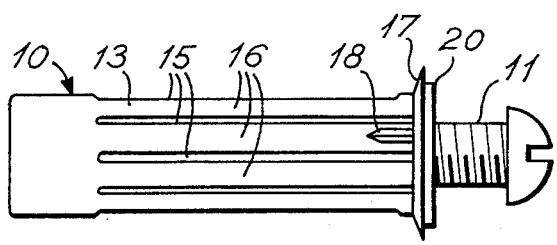
FIG. 1 is a side view of a first embodiment of the expandable screw anchoring device according to the invention.
Figure 2:
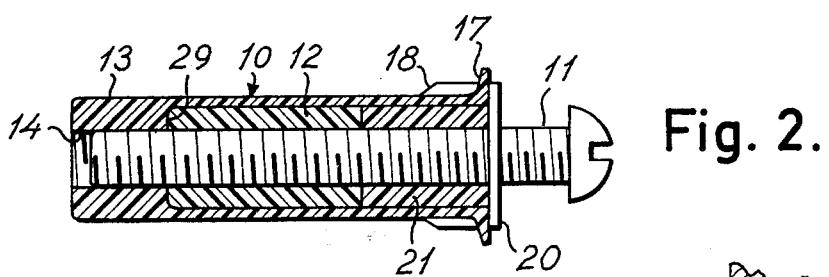
FIG. 2 illustrates a longitudinal section of the screw anchoring device shown in FIG. 1.
Figure 3:
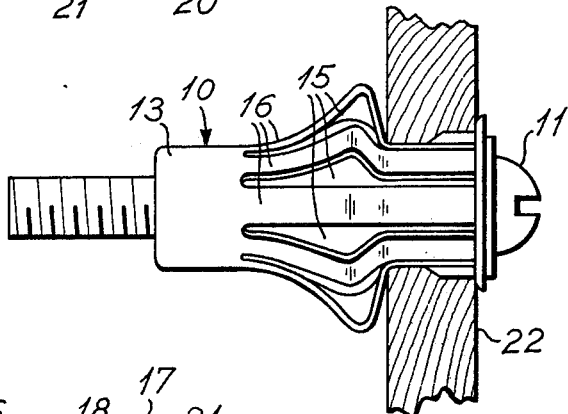
FIG. 3 is a side view and partially sectional view of the anchoring device shown in FIGS. 1 and 2 mounted in a bored hole in a plate or panel and being in a partially tightened condition.

The expandable anchoring device 10 illustrated in FIGS. 1–3 comprises a screw 11 the shank portion of which is surrounded by a tube section 12 (FIG. 2) of a soft deformable material, such as rubber or soft plastic. By way of example, the tube section 12 may be made of polyvinyl chloride having a specific weight of 1.24 grams per cubic centimeter and a hardness of about 65°D(ASTM D 1706/61). Further, by way of example, the tube section 12 may be made with an outer diameter of about 7.4 millimeters and a wall thickness of about 1.2 millimeters. The tube section 12 is surrounded by a tubular anchoring member or anchoring body 13 which is preferably integrally formed from plastic material. By way of example, the anchoring body 13 may be made of polyamide having a hardness of about shore 65°D (DIN 53505), an outer diameter of about 10 millimeters and a cylindrical wall thickness of about 1.2 millimeters. The tube section 12 fits between the screw 11 and the anchoring member 13 with a light fit. By way of example, the tube section 12 may have a wall thickness about equal to the wall thickness of the anchoring member 13. Alternatively, the tube section 12 may be omitted for example as described hereinafter in connection with the embodiment of FIG. 14.

At one end the anchoring member is provided with an axially extending, bore or threaded hole 14, and thus the said end serves as a nut for the screw 11. The cylindrical wall of the anchoring member 13 is provided with a number of uniformly circumferentially spaced and axially extending slits or slots 15 dividing the said wall up into a number of strip- or band-formed parts 16. At the end opposite to the threaded hole 14 the anchoring member 13 is provided with an abutment flange or collar 17 and knife-shaped axial ribs 18. The anchoring device may also be provided with a washer 20 for the head of the screw 11, and as shown in FIG. 2 a stiff, tubular sleeve member or distance member 21 is inserted in the end portion of the anchoring member 13 being provided with the ribs 18.

The expandable anchoring device described may especially advantageously be used in cases where an object is to be fastened by means of a screw to a plate or wall 22 the back surface of which is inaccessible or accessible only with difficulty as is the case by wall elements containing an inner space which may possibly be filled with a non-supporting insulating material. When the anchoring device is to be used a hole having an inner diameter substantially equal to the outer diameter of the anchoring member 13 is bored in the plate or wall, whereafter the end portion of the anchoring member 13 provided with the threaded hole 14 is pushed into the bored hole till the flange 17 abuts the front surface of the plate 22. The ribs 18 will simultaneously cut into the wall of the bored hole and thereby prevent rotation of the anchoring member within said hole. The tubular sleeve member 21 imparts such a stiffness to the end portion of the anchoring member provided with the flange 17 that the ribs 18 are prevented from retreating radially inwardly. Thereby the effective area of abutment between the anchoring member 13 and the wall of the bored hole is increased. The sleeve member of distance member 21 has another important function which will be described below. The screw 11 may now be screwed into the threaded hole 14 whereby the anchoring member 13 and the deformable sleeve 12 are compressed axially. The strip- or band-formed parts of the anchoring member 13 will thereby be bended and yield laterally as shown in FIG. 3. The distance member 21 is not compressed in an axial direction to any noticable extent.

Provided that the length of the screw 11 is sufficient the object which is to be fastened by means of the anchoring device may be placed between the head of the screw and the flange 17 before the screw is tightened. Alternatively it is possible, however, to remove the screw 11 when the anchoring device has been compressed, and the fastening of the said object may now take place by a renewed insertion and tightening of the screw 11.

Figure 4:
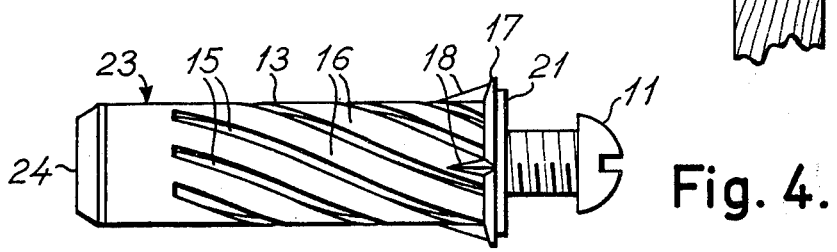
FIG. 4 is a side view of a second embodiment of the screw anchoring device according to the invention.
Figure 5:
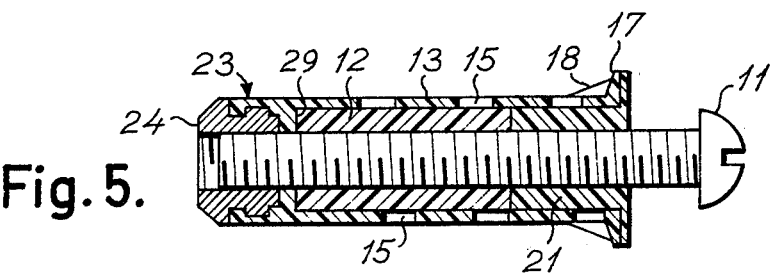
FIG. 5 illustrates a longitudinal section of the embodiment shown in FIG. 4.
Figure 6:
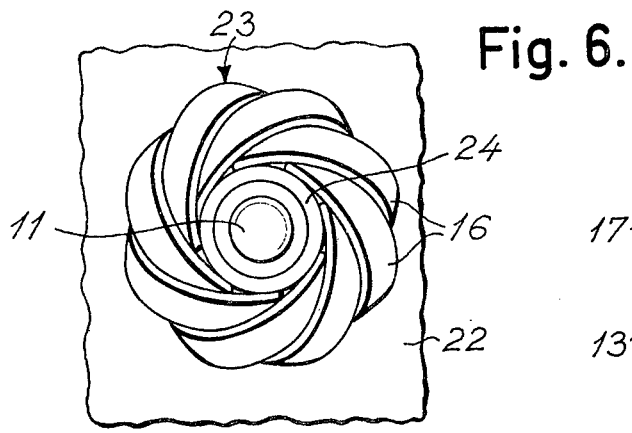
FIG. 6 illustrates the anchoring device shown in FIGS. 4 and 5 in its tightened condition and mounted in a bored hole in a plate or panel as viewed from the back of the plate.

A second embodiment 23 of the anchoring device according to the invention is shown in FIGS. 4–6. This embodiment differs from that shown in FIGS. 1–3 mainly thereby that the slits or slots 15 in the cylindrical wall of the anchoring member 13 are helical (FIG. 4), and that the screw 11 cooperates with a separate nut 24 arranged at the end of the anchoring device opposite to the flange 17, and said nut may for example be made from metal, a hard plastics material reinforced with e.g. glass fibres, or from a similar hard material. By way of example, the nut 24 may be made of modified polyphenylene oxide having a hardness of M 90/L 106 Rodswell R scale (ASTM No. D785). The nut may for example be fastened to the anchoring member 13 by screw threads or by moulding the respective end of the anchoring member around the nut. Furthermore, the sleeve or distance member 21 is provided with a collar or flange engaging the flange 17 of the anchoring member.

When the anchoring device shown in FIGS. 4 and 5 is mounted within a bored hole in a plate or panel 22 and the screw 11 cooperating with the nut 24 is thereafter tightened so that the deformable tube section 12 and the anchoring member 13 are compressed the helical strip- or band-formed parts 16 are bended outwardly to a spiral-like shape so as to partly overlap each other as shown in FIG. 6. The abutment provided by the strip-formed parts bent in the manner described is rather compact, stiff and resistant to a heavy tightening of the screw 11, because said parts tend to arrange themselves on their edges whereby their resisting moment is increased.

The helical slits or slots 15 are preferably formed in such a manner that the pitch of the slots rotates in the same direction as the pitch of the screw 11. In this case the torsion imparted to the end of the anchoring member provided with the screw tends to twist the anchoring member to a certain small degree in the same direction as that in which said slots rotate. If the pitch of the slots rotated in a direction opposite to the rotation of the pitch of the screw the torsion imparted to the threaded end of the anchoring member 13 by the screw would tend to straighten the helical slits or slots 15 and thus to counteract the above described advantageous effect which may be obtained by the helical form of the slits or slots, i.e. the obtainment of the stiff and compact abutment described above.

Figure 7:
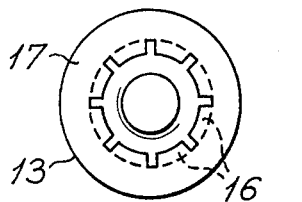
FIG. 7 illustrates the anchoring member or anchoring body of the anchoring device shown in FIGS. 1–5 as viewed from the front or right (as shown on the drawings) end thereof.

By all the embodiments described above the slits or slots 15 are advantageously extended through the flange 17 as illustrated in FIG. 7. The anchoring device may then be mounted in walls or plates even if they have a relatively small thickness. Furthermore, the said extension of the slots through the flange permits a cheaper and simpler production of the anchoring member 13 as will be described later on.

Figure 8:
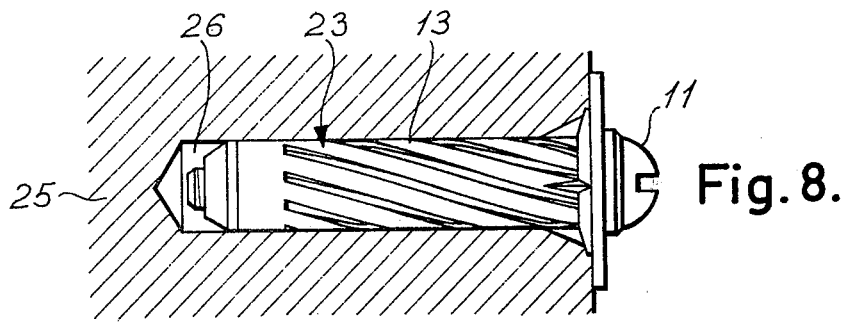
FIG. 8 illustrates the anchoring device shown in FIGS. 4 and 5 placed in a bored hole having an inner diameter corresponding substantially to the outer diameter of the anchoring member being shown before tightening of the screw.
Figure 9:
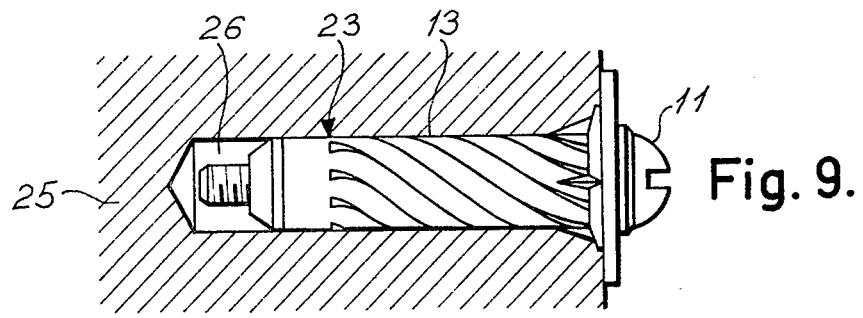
FIG. 9 illustrates the same as FIG. 8, but after tightening of the screw.

FIG. 8 illustrates an expandable anchoring device of the type shown in FIGS. 4 and 5 inserted in a non-through hole 26 bored in a solid wall 25 of a relatively pressure resistant material such as brick or concrete. The hole is bored with a diameter being substantially the same as the outer diameter of the anchoring member. When the screw 11 is tightened, the anchoring member is pressed vigorously against the inner wall of the bored hole 26. Due to the fact that the anchoring member cannot be expanded to a larger extend within the bored hole, the length of the anchoring member is correspondingly diminished to a rather small degree only (FIG. 9).

Figure 10:
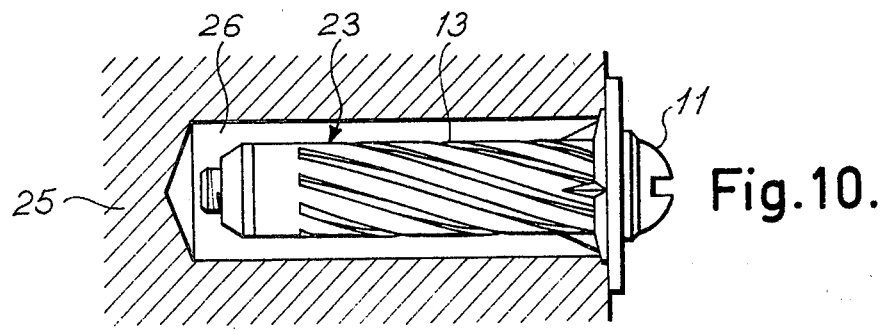
FIG. 10 illustrates the anchoring device shown in FIGS. 4 and 5 placed in a bored hole having an inner diameter substantially exceeding the outer diameter of the anchoring member being shown before tightening of the screw.
Figure 11:
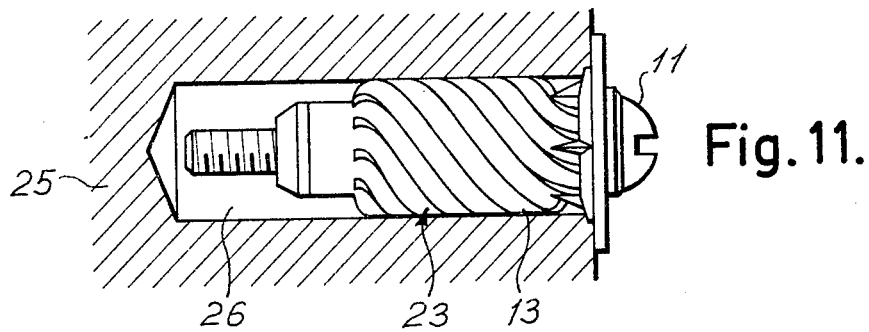
FIG. 11 illustrates the same as FIG. 10, but after tightening of the screw.

FIG. 10 also illustrates an anchoring device of the type shown in FIGS. 4 and 5 inserted in a non-through hole bored in a solid wall of a pressure resistant material, but here the hole 26 has an inner diameter substantially greater than the outer diameter of the anchoring device. When the screw 11 is tightened the anchoring member is considerably compressed axially, and thereby the anchoring member will also be expanded radially till the anchoring member engages the inner wall of the bored hole under a considerable pressure. Thus, also in the present case an effective anchoring is obtained (FIG. 11).

Figure 12:
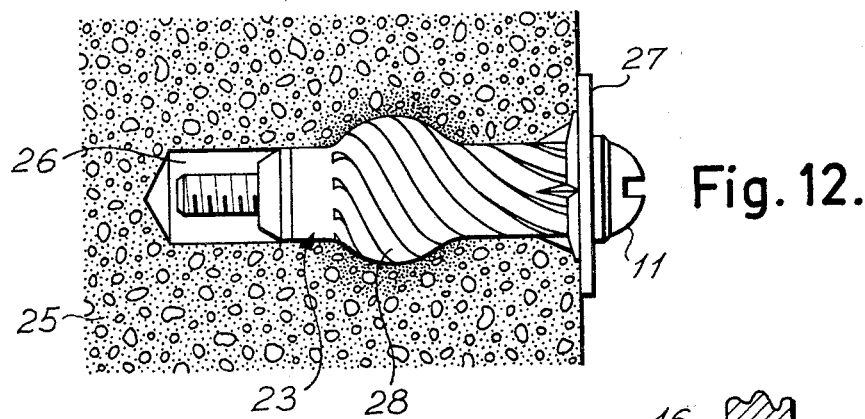
FIG. 12 illustrates the anchoring device shown in FIGS. 4 and 5 mounted and tightened within a hole bored in a solid wall of gas concrete or light concrete or a similar material.

In FIG. 12 the wall 25 consists of gas concrete or another porous building material with a relatively small resistance to pressure, and an expandable anchoring device of the type shown in FIGS. 4 and 5 intended for mounting an object 27 of some kind is inserted in the bored hole 26. When the screw 11 belonging to the anchoring device is tightened the anchoring member will bulge out as shown in FIG. 12 and displace a part of the porous material whereby the anchoring device is firmly anchored within the hole 26. The axial position of the bulge 28 is determined by the length of the sleeve or tubular distance member 21 used in connection with the anchoring device for the reason described previously.

Figure 13:
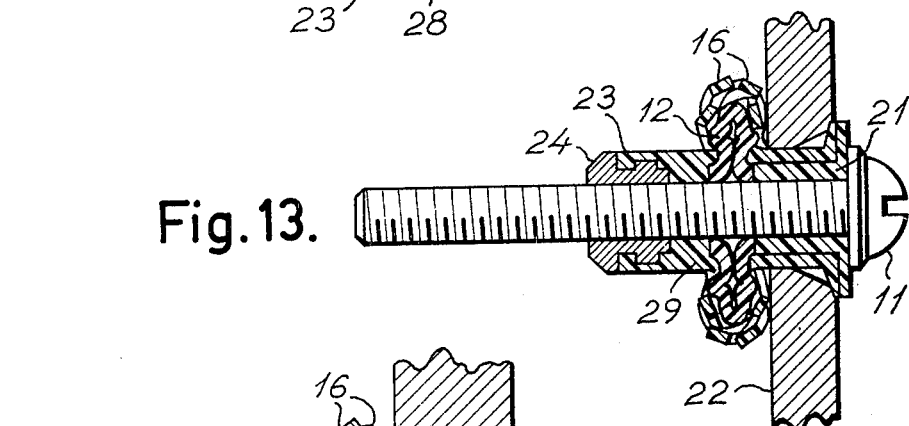
FIG. 13 illustrates the screw anchoring device shown in FIGS. 4 and 5 mounted and tightened within a hole bored in a relatively thin plate or panel.

When the anchoring device accoring to the invention is to be mounted in a plate or panel having a thickness being substantially smaller than the length of the anchoring device said anchoring device is preferably provided with a sleeve or distance member 21 the length of which exceeds the thickness of the plate to some extent. When the screw 11 is tightened the anchoring member 13 is compressed till the innermost end of the distance member 21 is not very far from a shoulder or an abutment 29 provided within the anchoring member, only the tube section 12 being placed between said distance member and said shoulder in a highly compressed condition (FIG. 13). Thereafter the screw 11 cannot be further tightened, and thus the distance member prevents the bulged or expanded part of the anchoring device from penetrating into and damaging the back of the plate 22. This is very important if the said plate is of a rather soft material. The compressed soft tube section 12 may serve as a buffer between the bended band-formed parts 16 and prevents damaging or shearing of these parts when the anchoring device is compressed. The tube section 12 also serves as a filler member which bulges radially outwardly when compressed axially and thereby provides a greater diameter of the rosette, i.e., the overlapping strip- or band-formed parts 16 shown in FIGS. 6 and 13, formed by the anchoring member 13 when the anchoring device is tightened. Thus the distance member may be provided in different lengths depending on the thickness and character of the plate or panel 22. In such cases, the tube section 12 may be made in different lengths so that the total length of the member 21 and tube section 12 remains the same.

Figure 14:
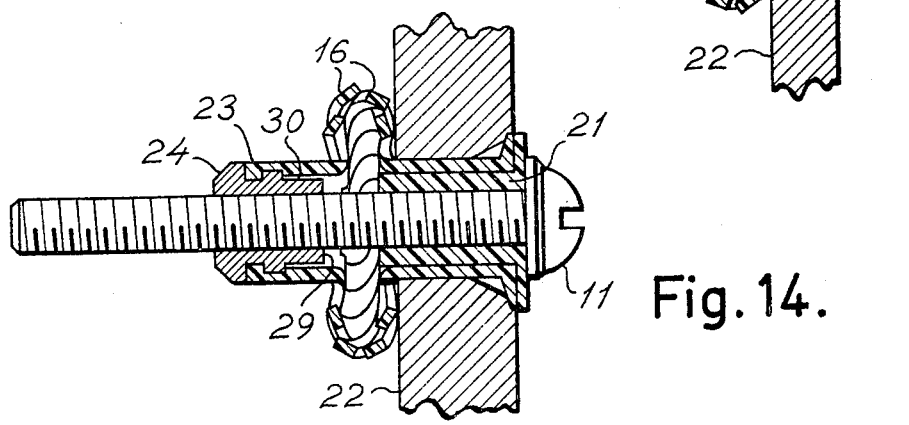
FIG. 14 illustrates an anchoring of the type shown in FIGS. 4 and 5, but slightly modified and mounted in a plate or panel substantially thicker than that shown in FIG. 13.

FIG. 13 shows an anchoring device mounted in a relatively thin plate or panel, whereas FIG. 14 shows a corresponding anchoring device having a longer sleeve or distance member 21 and being mounted in a substantially thicker plate or panel 22. The embodiment of the anchoring device according to the invention shown in FIG. 14 is, however, not provided with a tube section 12. Instead, the inner end of the nut 24 is formed as a projection 30 extending beyond the roots of the band-formed parts 16, but not being connected thereto. In the embodiment shown in FIG. 14 the free end of the said projection forms the internal abutment 29 of the anchoring member.

The embodiments 50 and 70 shown in FIGS. 15–17 and 19 are provided with a sleeve member 21 made from a semi-rigid, deformable plastics material, for example high density polyethylene, and the length of the sleeve member substantially exceeds the thickness of the plate 22 in which the anchoring device is mounted. In other words, the sleeve member 21 extends into the bored hole in the plate or wall 22 substantially beyond the position where it is desired to obtain the final position of the bulge on the anchoring device.

By way of example, the sleeve member 21 in the embodiments of FIGS. 15–17 and 19 may be made of polyethylene having a nominal density of 0.922 grams per cubic centimeter (British Standard 3412), a hardness of about shore 53°D, a modules of elasticity of about 2600 kilograms force per square centimeter (100 seconds, 0.2% deflection, see "Creep In Thermoplastics" on page 386 of "British Plastics" No. 37 from 1964), an outer diameter of about 7.4 millimeters and a cylindrical wall thickness of about 1.2 millimeters. In the embodiment 50 shown in FIGS. 15–17 a separate tubular expansion member 51 tapered at both ends is arranged between the internal abutment or shoulder 29 which is formed by the inner end of the nut 24 and the adjacent end of the sleeve member 21. The expansion member 51 is more rigid or stiff than the sleeve member 21, and is preferably made from a material harder than the material from which the sleeve member 21 is produced.

By way of example the expansion member 51 may be made of polyamide having a hardness of about shore 65°D (DIN 53505) an outer diameter of about 7.2 millimeters and a maximum wall thickness of about 1.1 millimeters.

Figure 16:
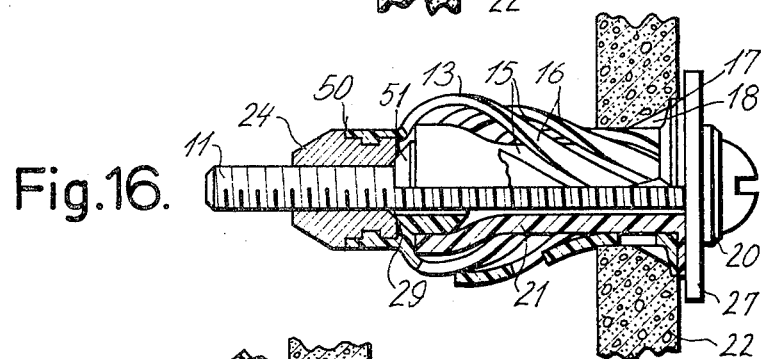
FIG. 16 illustrates the same as FIG. 15, but in a partially tightened condition.
Figure 17:
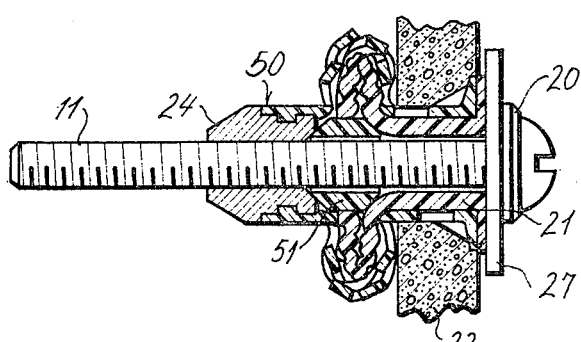
FIG. 17 illustrates a sectional view of the anchoring device shown in FIGS. 15 and 16 in its fully tightened condition.

When the screw 11 is tightened the tapered end of the expansion member 51 is driven into the bore of the adjacent end portion of the deformable sleeve member 21, and thereby start a radial bulging of the said end portion of the sleeve member (FIG. 16). A further tightening of the screw 11 will result in a more extensive radial expansion of the sleeve member 21 and the surrounding anchoring member 13 as shown in FIG. 17. It has been found that the expansion member 51 substantially facilitates the radical bulging of the semi-rigid sleeve member 21 and also secures substantially symmetrically bulging of the sleeve member about the longitudinal axis thereof. Furthermore, as illustrated in FIG. 17, the tubular expansion member 51 surrounds and protects the threads of the screw 11 and thereby prevents plastics material of the deformable sleeve member 21 from being pressed into contact with said threads. Such contact between the threads of the screw and the material of the sleeve member would make a subsequent unscrewing of the screw and demounting of the object 27 more difficult.

Although the present invention should not be limited to any specific theory about its function, it is believed that the importance of the tubular member or sleeve member 21 inserted in the anchoring member 13 of the anchoring device according to the invention may be explained as follows: when the anchoring device is inserted in a bored hole and the screw 11 is being tightened, the anchoring member 13 will be compressed axially. During compression the outer end portion of the anchoring member remains stationary whereas the threaded portion 14 or the nut 24 is moved outwardly in relation to the wall or plate in which the hole is bored. Therefore, the inner end portion of the anchoring member 13 adjacent to the threaded portion 14 or the nut 24 will mainly tend to bulge. When the axial compression of the anchoring device proceeds, the radial extend of said bulge increases, and the bulge is being displaced outwardly towards the outer end of the bore. Whether the sleeve member 21 is more or less axially compressible, it will sooner or later prevent further compression of the anchoring device even when the screw 11 is vigorously tightened.

Figure 15:
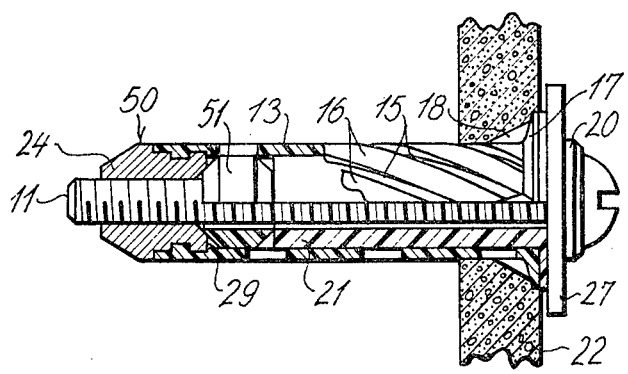
FIG. 15 illustrates a side view and partially sectional view of a third embodiment of the anchoring device mounted in a bored hole in a panel or plate.

In FIGS. 15–17, the sleeve member 21 also functions as a filling and bulge-promoting agent, as in the case of the tube section 12 in the embodiments of FIGS. 1–13, and also to impart a stiffness to the end portion of the anchoring member as in the embodiments of FIGS. 1–14. When the anchoring device is mounted in a through-going hole in a plate as shown in FIGS. 15–17, the sleeve section adjacent to the head of the screw is backed up or supported by the walls of the bored hole, and therefore, that sleeve section is still less inclined to expand radially than the inner part of the sleeve 21. When an anchoring device of the type shown in FIGS.

15–17 is mounted in a bored hole in a solid wall as shown in FIG. 12, the sleeve 21 is backed up or supported by the cylindrical wall of the hole in its total length. However, in such case the position where the initial bulging takes place may effectively be determined by the action of the expansion member 51 or the slits 52, see FIGS. 16 and 19. If an anchoring device of the type shown in FIGS. 15–17, but without the expansion member 51, is mounted in a bored hole in a solid wall, the position at which the anchoring device will bulge when tightened will be determined by the general theory described above but may easily be influenced by the characteristics and nature of the material in which the device is installed.

Figure 18:
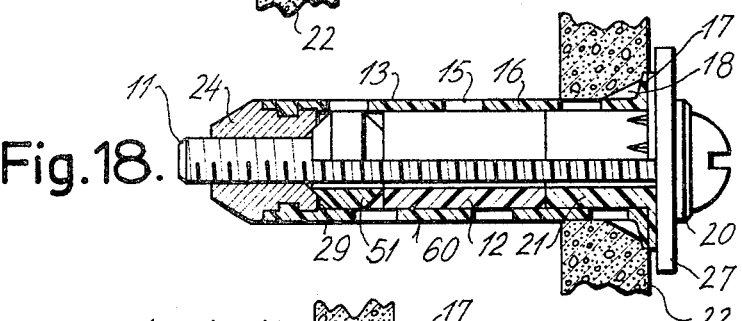
FIG. 18 illustrates a sectional view of a slightly modified embodiment of an anchoring device of the type shown in FIGS. 15–17.

The embodiment 60 shown in FIG. 18 substantially corresponds to the embodiment 23 shown in FIGS. 4–6, the main difference being that in the embodiment shown in FIG. 18, an expansion member 51 is arranged between the internal shoulder 29 and the adjacent end of the soft tube section 12. In the latter case the expansion member is driven into the bore of the tube section 12 and function in substantially the same manner as previously described when the screw 11 is tightened. The sleeve member 21 in the anchoring device 60 is made from a relatively stiff or rigid material and has a length slightly exceeding the thickness of the wall or plate 22. The tube section 12 is made from a soft material, such as rubber or a soft plastics material.

Figure 19:
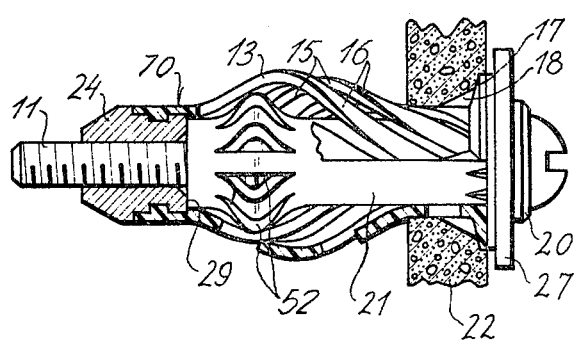
FIG. 19 illustrates a side view and partially sectional view of a fourth embodiment of the anchoring device according to the invention in a partially tightened condition.

The embodiment 70 shown in FIG. 19 corresponds substantially to the embodiment shown in FIGS. 15–17. In FIG. 19, however, the expansion member 51 has been eliminated. Instead, the sleeve member end portion adjacent to the nut 24 or abutment 29 is provided with a number of axially extending slits 52 for facilitating the radial bulging of that end portion. The slits 52 may be alternatively inclined in relation to the longitudinal axis of the sleeve member 21 or have a helical form. It should be noted that it may be advantageous to use an expansion member 51 in connection with a sleeve member 21 slitted as shown in FIG. 19.

Figure 20:
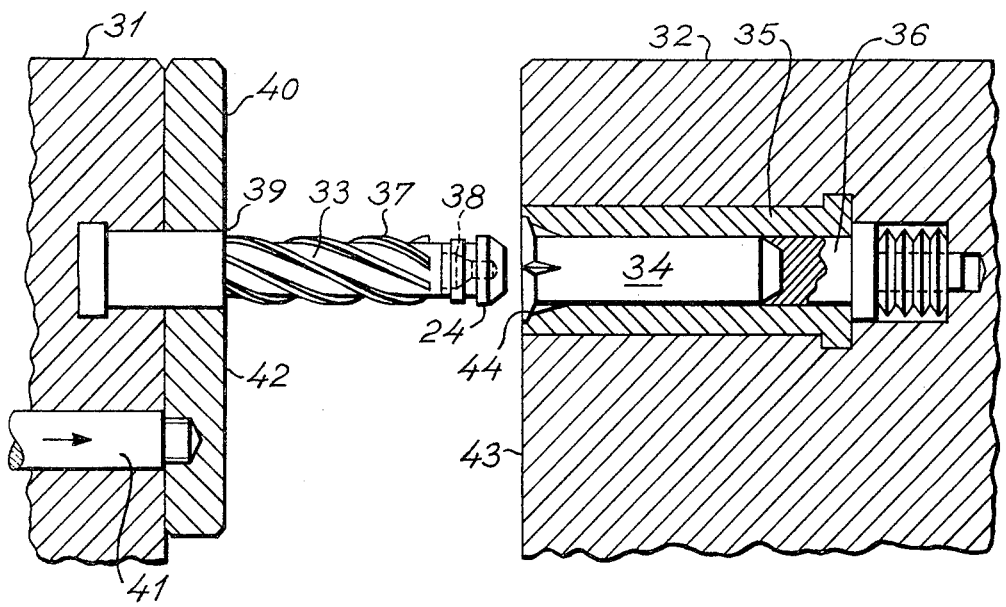
FIGS. 20 and 21 illustrate diagrammatically sectional views of a mould adapted for moulding anchoring members or anchoring bodies of the type shown in FIG. 4.
Figure 21:
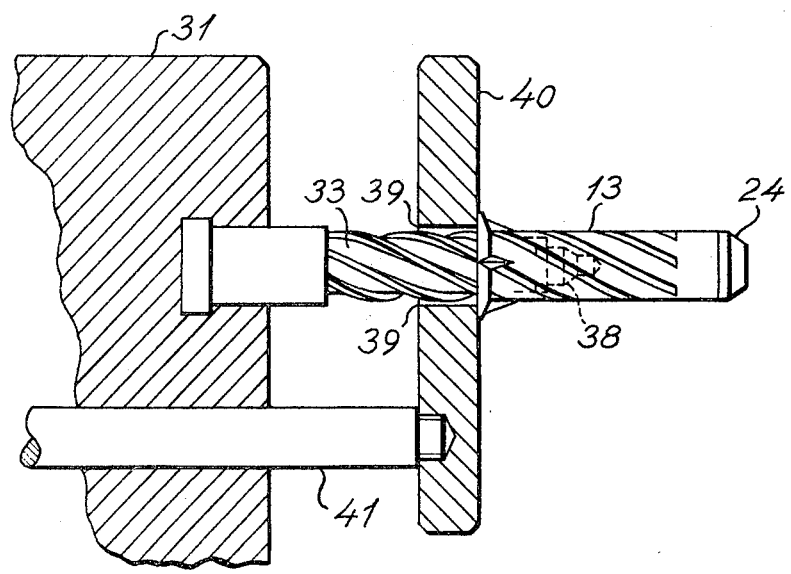

A method of moulding a tubular anchoring member 13 of the above type will now be described with reference to a mould illustrated diagrammatically in FIGS. 20 and 21.

The mould comprises two mould parts 31 and 32 of which the mould part 31 is provided with a substantially cylindrical core 33, whereas the mould part 32 contains a mould cavity 34. The mould cavity 34 is defined by a sleeve 35 and by a spring loaded bottom part 36.

The cylindrical surface of the core 33 is provided with a number of helical ribs 37 corresponding to the slits or slots in the anchoring member to be moulded. Furthermore, at its free end the core is provided with a projection for receiving a nut 24 which is to be embedded in the anchoring member. The core 33 projects through a bore 39 in a slip-off plate 40 which may be moved along the core 33 by means of a rod 41, for example by pneumatic, hydraulic, or mechanical means.

The mould described operates in the following manner:

When the mould parts 31 and 32 are in the relative positions shown in FIG. 15 a nut 24 is placed on the projection 38, whereafter the mould parts are moved towards each other whereby the core 33 is pushed into the cylindrical mould cavity 34. The dimensions of the mould cavity and the core are such that the peripheral surface parts on the ribs of the core closely engage the cylindrical inner wall of the mould cavity, and when the mould parts are closed the nut placed on the projection 38 abuts the spring loaded bottom part 36, whereby the nut is pressed towards the core 33. When the mould parts are closed the front surface 42 of the slip-off plate 40 engages the opposite surface of the mould part 32. It is to be understood that in this position of the mould parts the ribs 37 on the core extend into a chamfering 44 at the outer end of the sleeve 35, in which chamfering the abutment flange 17 of the anchoring member is formed. Plastic or another suitable moulding material is now introduced into the mould cavity through an injection passage not shown. When the anchoring member 13 has been formed within the mould cavity the mould parts are separated and the moulded anchoring member is moved out from the mould cavity together with the core and remain on the same till the slip-off plate is moved to the right (as shown in FIG. 21) by means of the rod 41. Thereby the anchoring member 13 is pushed from the core, the said anchoring member moving helically in relation to the core.

Although a mould having only a single mould cavity has been described it should be understood that each mould may contain any desired number of mould cavities. Furthermore, it should be understood that within the scope of the invention a number of modifications of the described embodiments of the anchoring device and the method according to the invention may be made. For example, the anchoring device according to the invention may be of the type comprising a self-tapping screw cooperating with an inner cylindrical surface part of the anchoring member.

It will be appreciated that the expandable anchoring device according to the invention is very universal because it is effective as well for through holes in plates or panels as for non-through holes in solid walls whether these walls are made from more or less pressure resistant materials and whether the diameters of the bored holes correspond more or less to the outer diameter of the anchoring device.

What is claimed is:

1. A screw anchoring device of the expandable type comprising:
    a deformable elongated tubular anchoring member molded of plastic material and having elongated wall parts defined by slits or slots therein extending longitudinally up to a first end of the anchoring member,
    a circumferentially continuous flange at said first end of the anchoring member,
    an internal abutment defined within a second end portion of the tubular anchoring member,
    a portion having a bore hole at said second end of the tubular anchoring member,
    elongated tubular means inserted in said anchoring member and extending between said first end and said internal abutment, said tubular means comprising first and second tubular members of like diameter slidably snugly received in said tubular anchoring member and axially disposed in end-to-end relationship therein, one of said tubular members being less compressible in an axial direction than the other, said less compressible tubular member being adjacent said first end of the anchoring member at least one of said tubular members of said tubular means being substantially less compressible in an axial direction than said slitted anchoring member, a threaded screw extending into said anchoring member from said first end thereof, through said tubular means and into said bore hole to threadedly engage the latter to draw said second end of said anchoring member toward said first end and thereby axially compress said tubular means and cause said elongated wall parts to bow outwardly under control of said tubular means.

2. A screw anchoring device according to claim 1, in which one of said tubular members of said tubular means comprises an axially compressible plastic tube.

3. A screw anchoring device according to claim 1, in which one of said tubular members of said tubular means comprises a semi-rigid tube the inner end of which is spaced from said internal abutment in an initial position of said device.

4. A screw anchoring device according to claim 3, in which said semi-rigid tube at its outer end has an annular flange engaging said flange at the first end of said anchoring member.

5. A screw anchoring device according to claim 1, in which said first tubular member of said tubular means comprises a relatively rigid first tube extending in from said first end of said anchoring member with an inner end spaced from said internal abutment and said second tubular member of said tubular means comprises an axially compressible second tube disposed between the inner end of said first tube and said internal abutment.

6. A screw anchoring device according to claim 1, in which said slits or slots extend in a helical manner.

7. A screw anchoring device according to claim 6, in which the pitch of the threads of said threaded screw rotates in the same direction as the pitch of said helical slits or slots.

8. A screw anchoring device according to claim 1, in which said portion having a bore hole comprises a nut molded into said second end portion of said anchoring member and having an internally threaded bore.

9. A screw anchoring device of the expandable type comprising:

a deformable elongated tubular anchoring member molded of plastic material and having elongated wall parts defined by slits or slots therein extending longitudinally up to a first end of the anchoring member and terminating short of a second end of the anchoring member, a circumferentially continuous flange at said first end of the anchoring member, an internal abutment defined within said second end portion of the anchoring member, a portion having a bore hole at said second end of the anchoring member, elongated tubular means inserted in said anchoring member and extending between said first end of the anchoring member and said internal abutment, said tubular means being slidably snugly received in said slitted anchoring member and at least a substantial part of said tubular means being substantially less compressible in an axial direction than said slitted anchoring member, a tubular expansion member positioned within said anchoring member between the abutment therein and said tubular means, said expansion member having an outer diameter substantially the same as that of the tubular means and being slidably snugly received in said anchoring member in axially disposed end-to-end relationship with said elongated tubular means, said expansion member having a tapered end adapted to be driven into the adjacent end portion of said tubular means for expanding the same radially when the anchoring device is compressed axially, and a threaded screw extending into said anchoring member from said first end thereof, through said tubular means and tubular expansion member and into said bore hole to threadedly engage the latter to draw said second end of said anchoring member toward said first end and thereby cause said expansion member to enter and radially expand said tubular means and to compress said tubular means axially to cause said elongated wall parts of said anchoring member to bow outwardly under control of said tubular means.

10. A screw anchoring device according to claim 9, wherein said tubular means comprises a relatively rigid first tube extending from said first end of the anchoring member, and a relatively soft, axially compressible second tube disposed between the inner end of said first tube and said expansion member.

11. A screw anchoring device according to claim 9, in which said expansion member is tapered at both ends.

12. A screw anchoring device of the expandable type comprising:

a deformable elongated tubular anchoring member molded of plastic material and having longitudinally extending elongated wall parts defined by slits or slots therein extending longitudinally up to a first end of the anchoring member and terminating short of a second end of the anchoring member, a circumferentially continuous flange at said first end of the anchoring member, an internal abutment defined within said second end portion of the anchoring member, a portion having a bore hole at said second end of the anchoring member, an elongated semi-rigid deformable tubular plastic member inserted in said anchoring member and extending inwardly from said first end thereof, said tubular member being slidably snugly received in said anchoring member and being substantially less compressible in an axial direction than said anchoring member, a tubular expansion member positioned within said anchoring member between said abutment therein and said tubular member, said expansion member having an outer diameter substantially the same as that of said tubular plastic member and being slidably snugly received in said anchoring member in axially disposed end-to-end relationship with said tubular plastic member, said expansion member having a tapered end adapted to be driven into the adjacent end portion of said tubular plastic member for expanding the same radially, and a threaded screw extending into said anchoring member from said first end thereof, through said tubular member and said expansion member and into said bore hole to threadedly engage the latter to draw said second end of said anchoring member towards said first end and thereby force the expansion member into the adjacent end portion of the tubular member to expand the same and to compress said tubular means axially to cause said elongated wall parts of said anchoring member to bow outwardly under control of said tubular member.

13. A screw anchoring device according to claim 12 in which said expansion member is tapered at both ends.

14. A screw anchoring device of the expandable type comprising:
- a deformable elongated tubular anchoring member molded of plastic material and having elongated wall parts defined by slits or slots therein, said anchoring member having a circumferentially continuous flanged first end portion and a circumferentially continuous second end portion,
- engageable means having a bore hole at said second end portion of said anchoring member,
- an abutment means at said second end portion of said anchoring member,
- elongated tubular means in said anchoring member extending inwardly from said first end portion of said anchoring member, said tubular means being slidably snugly received in said anchoring member and at least a substantial part of said tubular means being substantially less compressible in an axial direction than said anchoring member,
- a tubular expansion member in said anchoring member between said abutment means and said elongated tubular means, said expansion member having an outer diameter substantially the same as said tubular means and being slidably snugly received in said anchoring member in axially disposed end-to-end relationship with said tubular means,
- a threaded screw extending into said anchoring member from said first end portion thereof through said tubular means and said expansion member and into said bore hole of said engageable means to threadedly engage the latter to draw said second end of said anchoring member toward said first end and thereby cause said wall parts of said anchoring member to bow outwardly, said tubular expansion member having a portion which is insertable radially between said threaded screw and said tubular means to expand the tubular means radially when the anchoring device is compressed axially.

15. A screw anchoring device according to claim 14, wherein said tubular means comprises a single tubular element extending inwardly from said first end of said anchor member to engage said expansion member.

16. A screw anchoring device according to claim 15, wherein said tubular means comprises a first tube element extending from said first end portion of said anchor member and a second tube element disposed between the inner end of said first tube element and said expansion member, said first tube element being more rigid than said second tube element in that the first tube element remains substantially intact and substantially axially uncompressed while said second tube element is axially compressed to cause the walls thereof to bow radially outwardly as said second end of said anchoring member is drawn to said first end of said anchoring member.

17. A screw anchoring device according to claim 1, wherein said abutment means and said portion having a bore hole are integrally formed as a nut, said second end portion of said anchoring member being molded around said nut.

* * * * *